(12) United States Patent
Iwamoto

(10) Patent No.: US 8,411,160 B2
(45) Date of Patent: Apr. 2, 2013

(54) APPARATUS INCLUDING FUNCTION TO SPECIFY IMAGE REGION OF MAIN SUBJECT FROM OBTAINED IMAGE, METHOD TO SPECIFY IMAGE REGION OF MAIN SUBJECT FROM OBTAINED IMAGE AND COMPUTER READABLE STORAGE MEDIUM STORING PROGRAM TO SPECIFY IMAGE REGION OF MAIN SUBJECT FROM OBTAINED IMAGE

(75) Inventor: Kenji Iwamoto, Kokubunji (JP)

(73) Assignee: Casio Computer Co., Ltd., Tokyo (JP)

( * ) Notice: Subject to any disclaimer, the term of this patent is extended or adjusted under 35 U.S.C. 154(b) by 816 days.

(21) Appl. No.: 12/200,133

(22) Filed: Aug. 28, 2008

(65) Prior Publication Data

US 2009/0059027 A1 Mar. 5, 2009

(30) Foreign Application Priority Data

Aug. 31, 2007 (JP) ................. 2007-226151

(51) Int. Cl.
*H04N 5/228* (2006.01)
(52) U.S. Cl. .................. 348/222.1; 348/345; 348/14.1
(58) Field of Classification Search ............... 348/14.1, 348/14.16, 14.08, 14.01, 211.9, 345–356, 348/222.1
See application file for complete search history.

(56) References Cited

U.S. PATENT DOCUMENTS 6,593,956 B1 * 7/2003 Potts et al. ................. 348/14.09
2001/0055059 A1 * 12/2001 Satoda ....................... 348/14.05
2002/0101505 A1 * 8/2002 Gutta et al. ................ 348/14.07
2009/0135269 A1 * 5/2009 Nozaki et al. ............. 348/222.1

FOREIGN PATENT DOCUMENTS

| | | |
|---|---|---|
| JP | 2001-067098 A | 3/2001 |
| JP | 2003-189273 A | 7/2003 |
| JP | 2003-230049 A | 8/2003 |
| JP | 2003-330485 A | 11/2003 |
| JP | 2004-056286 A | 2/2004 |
| JP | 2004-298988 A | 10/2004 |
| JP | 2007-027990 A | 2/2007 |
| JP | 2007-034532 A | 2/2007 |
| JP | 2007-080057 A | 3/2007 |
| JP | 2007-150603 A | 6/2007 |
| JP | 2007-219207 A | 8/2007 |

OTHER PUBLICATIONS

Machine English Translation of JP 2003-189273, Published Jul. 4, 2003.*
Machine English Translation of JP 2007-027990 A (published on Feb. 1, 2007).*
Japanese Office Action dated Jul. 28, 2009 and English translation thereof issued in a counterpart—Application No. 2007-226151.
Japanese Office Action dated Sep. 13, 2011 (and English translation thereof) in counterpart Japanese Application No. 2010-009995.
Japanese Office Action dated Jul. 5, 2011 (and English translation thereof) in counterpart Japanese Application No. 2007-226151.

* cited by examiner

*Primary Examiner* — Nelson D. Hernández Hernández
(74) *Attorney, Agent, or Firm* — Holtz, Holtz, Goodman & Chick, P.C.

(57) ABSTRACT

Disclosed is an image pickup apparatus 100 including a sound obtaining section 6 to obtain a sound emitted from the main subject and a central control section 71 to specify an image region of the main subject based on the sound obtained by the sound obtaining section 6 in order to specify the image region of the main subject from an obtained image.

13 Claims, 10 Drawing Sheets

|  | STANDARD AUDIO DATA | FACIAL FEATURE DATA |
|---|---|---|
| MALE | ... | ... |
| FEMALE | ... | ... |

|  | STANDARD AUDIO DATA | FACIAL FEATURE DATA |
|---|---|---|
| AGE 1 | ... | ... |
| AGE 2 | ... | ... |
| AGE 3 | ... | ... |
| ⋮ | ⋮ | ⋮ |

|  | STANDARD AUDIO DATA | FACIAL FEATURE DATA |
|---|---|---|
| NATIONALITY 1 | ... | ... |
| NATIONALITY 2 | ... | ... |
| NATIONALITY 3 | ... | ... |
| ⋮ | ⋮ | ⋮ |

|  | SOUND DATA | FACE IMAGE DATA |
|---|---|---|
| NAME OF PERSON 1 | ... | ... |
| NAME OF PERSON 2 | ... | ... |
| NAME OF PERSON 3 | ... | ... |
| ⋮ | ⋮ | ⋮ |

APPARATUS INCLUDING FUNCTION TO SPECIFY IMAGE REGION OF MAIN SUBJECT FROM OBTAINED IMAGE, METHOD TO SPECIFY IMAGE REGION OF MAIN SUBJECT FROM OBTAINED IMAGE AND COMPUTER READABLE STORAGE MEDIUM STORING PROGRAM TO SPECIFY IMAGE REGION OF MAIN SUBJECT FROM OBTAINED IMAGE

BACKGROUND OF THE INVENTION

1. Field of the Invention

The present invention relates to an apparatus including a function to specify an image region of a main subject from an obtained image, a method to specify an image region of a main subject from an obtained image and a computer readable storage medium storing a program to specify an image region of a main subject from an obtained image.

2. Description of Related Art

Conventionally, there is known a technique in which the image detection of the main subject is carried out by the image pickup apparatus, and which determines whether the direction of the subject in which the image is detected and the direction of the subject in which the voice is detected match one another or not by carrying out the voice detection of the main subject by the sound obtaining apparatus. In this technique, it is determined as a recognition error when the directions do not match.

SUMMARY OF THE INVENTION

An object of the present invention is to provide an apparatus including a function to specify an image region of a main subject from an obtained image, a method to specify an image region of a main subject from an obtained image and a computer readable storage medium storing a program to specify an image region of a main subject from an obtained image.

In order to achieve the object, an apparatus to specify an image region of a main subject from an obtained image comprises a sound obtaining unit to obtain a sound emitted from the main subject and a specification unit to specify the image region of the main subject based on the sound obtained by the sound obtaining unit.

Moreover, a method to specify an image region of a main subject from an obtained image of the present invention comprises making a sound obtaining unit obtain a sound emitted from the main subject and specifying the image region of the main subject based on the sound obtained by the sound obtaining unit.

Further, a program product of the present invention which stores a program to make a computer specify an image region of a main subject from an obtained image realizes function of making a sound obtaining unit obtain a sound emitted from the main subject and specifying the image region of the main subject based on the sound obtained by the sound obtaining unit.

BRIEF DESCRIPTION OF THE DRAWINGS

FIG. 9A is a diagram schematically expressing an example of information specification data of the image pickup apparatus of FIG. 1.

FIG. 9B is a diagram schematically expressing an example of information specification data of the image pickup apparatus of FIG. 1.

FIG. 9C is a diagram schematically expressing an example of information specification data of the image pickup apparatus of FIG. 1.

FIG. 10 is a diagram schematically expressing an example of a registration table stored in the data storage section of the image pick up apparatus of FIG. 8.

DESCRIPTION OF THE PREFERRED EMBODIMENTS

Figure 1:
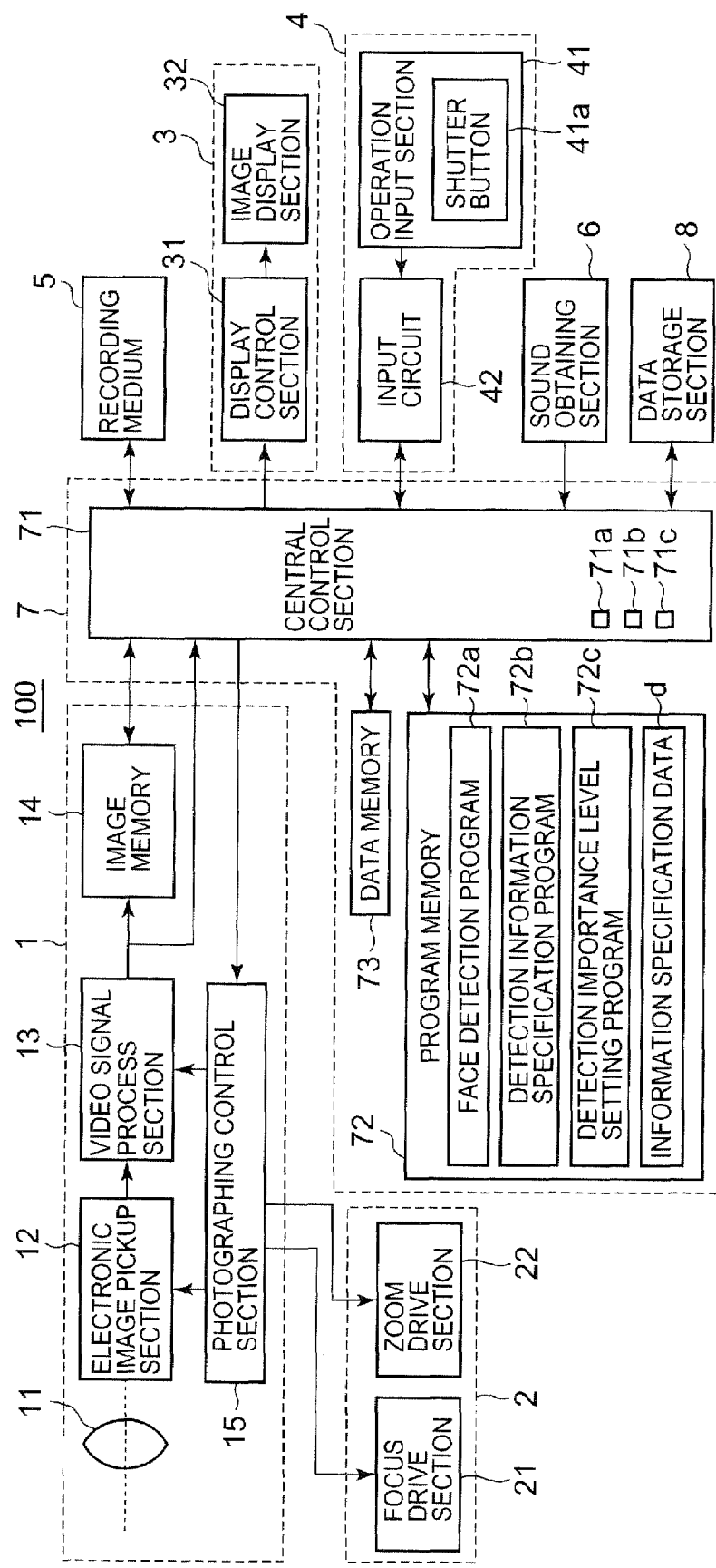
FIG. 1 is a block diagram showing an outline structure of an image pickup apparatus of an embodiment in which the present invention is applied.

Hereinafter, a specific embodiment of the present invention will be described by using the drawings. However, the scope of the invention is not limited to the examples shown in the drawings.

FIG. 1 is a block diagram showing an outline structure of an image pickup apparatus 100 of an embodiment in which the present invention is applied.

The image pickup apparatus 100 of the embodiment recognizes the voice emitted by a person who is the main subject to specify the sound related information for detection (the main subject information) such as the voice emission direction, gender, age and nationality of the person. Then, the image pickup apparatus 100 sets the importance level of the sound related information for detection so as to be high and carries out the face detection.

Particularly, as shown in FIG. 1 the image pickup apparatus 100 comprises an image pickup section 1, and image pickup supporting section 2, a display section 3, an operation section 4, a recording medium 5, a sound obtaining section 6, a control section 7, a data storage section 8 and the like.

The image pickup section 1 comprises an image pickup lens group 11, an electronic image pickup section 12, a video signal process section 13, an image memory 14, a photographing control section 15 and the like.

The image pickup lens group 11 is constituted with a plurality of image pickup lenses.

The electronic image pickup section 12 is constituted with an image pickup element such as the CCD (Charge Coupled Device), the CMOS (Complementary Metal-oxide Semiconductor) or the like which converts the subject image which passed through the image pickup lens group 11 into a two dimensional image signal.

The video signal process section 13 carries out a predetermined image process to the image signal which is output from the electronic image pickup section 12.

The image memory 14 temporarily stores the image signal after the image process is carried out.

The photographing control section 15 controls the electronic image pickup section 12 and the video signal process section 13 under the control of the central control section 71. Particularly, the photographing control section 15 makes the electronic image pickup section 12 pick up the image of the subject in a predetermined exposure time, and controls the execution of the reading process in which the image signal is read at a predetermined frame rate from the image pickup region of the electronic image pickup section 12.

The image pickup section 1 of the above structure constitutes the image pickup unit to obtain the picked-up image data (image signal) by picking up the image of the subject.

The image pickup supporting section 2 is driven when the image pickup section 1 picks up the image of the subject, and the image pickup supporting section 2 comprises a focus drive section 21, a zoom drive section 22 and the like.

The focus drive section 21 drives the focus mechanism section (omitted from the drawing) which is connected to the image pickup lens group 11.

The zoom drive section 22 drives the zoom mechanism section (omitted from the drawing) which is connected to the image pickup lens group 11.

Here, the focus drive section 21 and the zoom drive section 22 are connected to the photographing control section 15 and are driven under the control of the photographing control section 15.

The display section 3 displays the image which is picked up by the image pickup section 1, and the display section 3 comprises a display control section 31, an image display section 32 and the like.

The display control section 31 comprises a video memory (omitted from the drawing) to temporarily store the display data which is arbitrarily output from the central control section 71.

The image display section 32 displays a predetermined image and information on the display screen based on the output signal from the display control section 31. Particularly, the image display section 32 displays the subject image (see FIGS. 2A and 2B) which is picked up by the image pickup process. Then, when a face is detected by the face detection process (after mentioned), the image display section 32 displays the frame W (the image region of the main subject) in an approximately rectangular shape so as to superimpose on the face (see FIG. 2B).

Figure 2A:
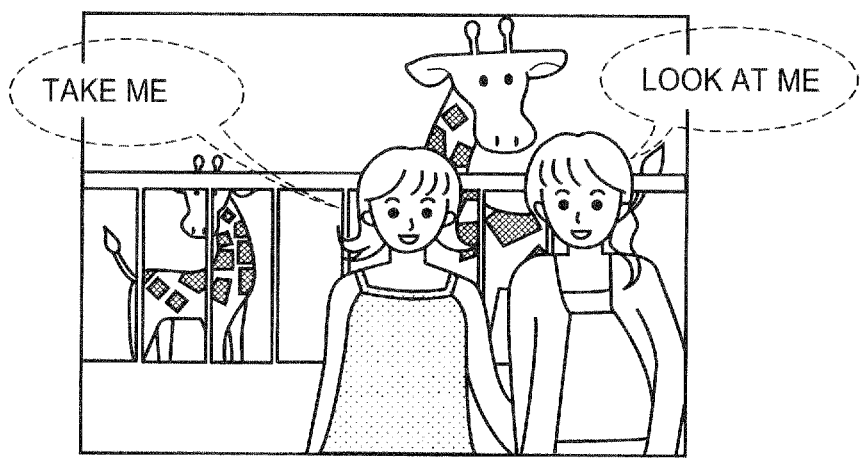
FIG. 2A is a diagram schematically showing an example of a subject image which is displayed in an image display section of the image pickup apparatus of FIG. 1.
Figure 2B:
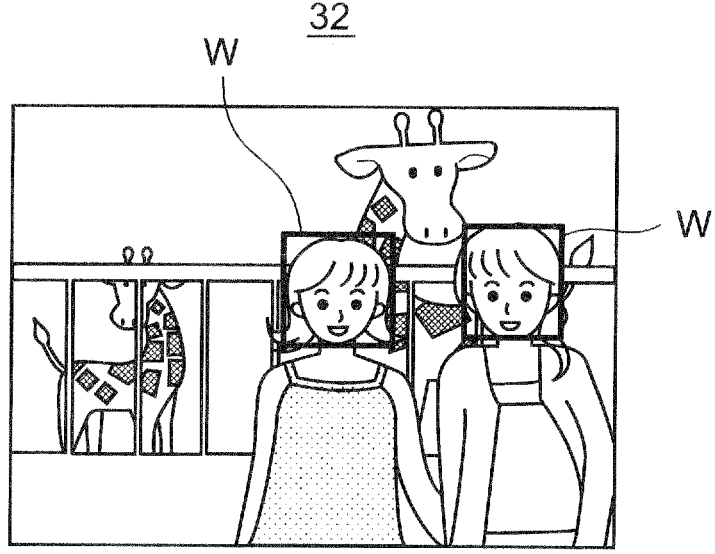
FIG. 2B is a diagram schematically showing an example of a subject image which is displayed in the image display section of the image pickup apparatus of FIG. 1.

Here, in FIG. 2A, the voices such as "Take me" and "Look at me" which are emitted from each of the girls as main subjects are schematically expressed by dialogue balloons.

The operation section 4 is for carrying out a predetermined operation of the image pickup apparatus 100, and the operation section 4 comprises an operation input section 41, an input circuit 42 and the like.

The operation input section 41 comprises a shutter button 41a to instruct the picking up of the image of the subject by the image pickup section 1. For example, the shutter button 41a is structured so that the two-step pushing operation of the half-push operation and the full-push operation is possible, and the shutter button 41a outputs a predetermined operation signal according to each operation.

The input circuit 42 is a circuit in which the operation signal which is output from the operation input section 41 passes through to be input to the central control section 71.

For example, the recording medium 5 is constituted with a card type non-volatile memory (flash memory), the hard disk or the like, and the recording medium 5 records the picked-up image data which is generated by the image pickup section 1.

For example, the sound obtaining section 6 comprises a microphone, an amplifier (omitted from the drawing) and the like, and the sound obtaining section 6 generates the sound data by obtaining a predetermined audio emitted from the surrounding and outputs the sound data to the central control section 71. Particularly, as the sound obtaining unit, the sound obtaining section 6 obtains the sound of voice emitted from the girls (persons) as the main subjects such as "Take me", "Look at me" and the like (see FIG. 2A).

The microphone has a directionality, and it is preferable that a plurality of microphones are provided in order to specify the voice emission direction from the person (the main subject), that is, the speaker direction. However, the type of the microphone may be any other type as long as the speaker direction can be specified.

Figure 3A:
FIG. 3A is a diagram schematically showing an example of a face image data and a sound data which are stored in a data storage section of the image pickup apparatus of FIG. 1.
Figure 3B:
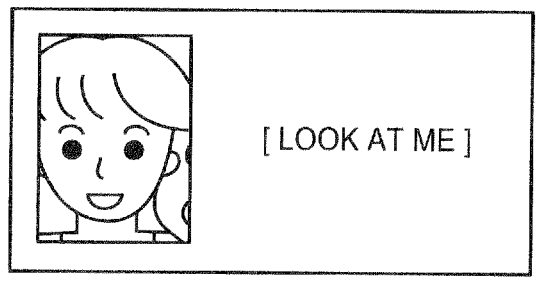
FIG. 3B is a diagram schematically showing an example of a face image data and a sound data which are stored in the data storage section of the image pickup apparatus of FIG. 1.

The data storage section 8 stores the face image data (the main subject information) detected by the face detection process and the sound data generated by the sound obtaining section 6 so as to correspond to one another (see FIGS. 3A and 3B). For example, the data storage section 8 stores the face image data of the girl in left side (see FIG. 2B) which is detected by the face detection process and the sound data of "Take me" so as to correspond to one another (see FIG. 3A), and also stores the face image data of the girl in right side (see FIG. 2B) and the sound data of "Look at me" so as to correspond to one another (see FIG. 3B).

Here, the face image data is stored in the above description. However, it is needless to say that the data which indicates the feature portion of the face image may be stored instead of the face image data itself.

For example, data of the feature portion indicating features such as gender, age and nationality which are extracted from the face image data may be recorded.

Similarly, the sound data is stored in the above description. However, it is needless to say that the data which indicates the feature portion of the voice may be stored instead of the sound data itself.

Here, when the person according to the face which is detected by the face detection process is specified, the name of the person is to be input thereafter based on a predetermined operation of the operation input section 41, for example.

In such way, in the face detection process and the face recognition process which are carried out thereafter, the person who is the main subject can be recognized and specified preferably by using the face image data, the sound data and the like stored in the data storage section 8.

The control section 7 is for controlling each section of the image pickup apparatus 100, and the control section 7 comprises the central control section 71, a program memory 72, a data memory 73 and the like.

The central control section 71 carries out various types of control operations according to various types of process programs for the image pickup apparatus 100 which are stored in the program memory 72.

For example, the data memory 73 is constituted with a flash memory or the like and temporarily stores the data and the like which are to be processed by the central control section 71.

The program memory 72 stores various types of programs and data which are required for the operation of the central control section 71. Particularly, the program memory 72 stores the face detection program 72a, the detection information specification program 72b, the detection importance level setting program 72c, the information specification data d and the like.

In order to correspond to these programs, the central control section 71 comprises the face detection program process section 71a which corresponds to the face detection program 72a, the detection information specification program process section 71b which corresponds to the detection information specification program 72b and the detection importance level setting program process section 71c which corresponds to the detection importance level setting program 72c.

The face detection program 72a makes the central control section 71 function as the main subject detection unit. That is, the face detection program 72a is a program to make the central control section 71 realize the function according to the process to detect the face of the person who is the main subject within the subject image based on the picked-up image data generated by the image pickup section 1.

Particularly, by the central control section 71 executing the face detection program 72a, the feature portions (face parts) corresponding to eyes, nose, mouth and the like are specified by scanning one picked up image data in a predetermined direction by using the face search frame among a plurality of picked-up image data. Then, it is determined whether it is a face or not from the positional relation of each face part, and the search frame region is detected as the face region when it is determined as a face. Further, the face detection process is carried out by considering the importance level of the sound related information for detection which is set by the after mentioned detection importance level setting process.

Here, the above described method of face detection process is an example, and the face detection process is not limited to this.

The detection information specification program 72b makes the central control section 71 function as the detection information specification unit. That is, the detection information specification program 72b is a program to make the central control section 71 realize the function according to the process to specify the sound related information for detection such as the voice emission direction, gender, age, nationality and the like for detection of the face of the person by the face detection process based on the sound of voice obtained by the sound obtaining section 6.

Particularly, by the central control section 71 executing the detection information specification program 72b, the sound data generated by the voice being obtained by a plurality of microphones of the sound obtaining section 6 is analyzed to specify the speaker direction of the main subject based on the analyzed result, and also gender, age and nationality of the main subject are specified by referring to the information specification data d.

Here, the technique of estimating age, gender and nationality of the speaker by the voice recognition is already known to the public.

The detection importance level setting program 72c makes the central control section 71 function as the detection importance level setting unit. That is, the detection importance level setting program 72c is a program to make the central control section 71 realize the function according to the detection importance level setting process to set the importance level of the voice emission direction, gender, age, nationality and the like of the main subject which are specified by the detection information specification process so as to be high when the face of the person is being detected by the face detection process.

Particularly, by the central control section 71 executing the detection importance level setting program 72c, the face detection is executed centering on the speaker direction of the main subject, further, the standard positional relation of each face part is set according to gender, age and nationality, and further, the standard contrasting density of skin color of the main portion of the face is set according to nationality in the face detection process. Thus, the specific person can be detected easily.

Here, the technique of estimating age, gender and nationality of the face detected by the face detection is already known to the public. This technique is to find a predetermined feature from the detected face. However, by using this technique conversely, the detection of the face can be carried out easily by improving the importance level of a predetermined face by using a predetermined feature.

Here, setting or not-setting of the importance level of elements such as the voice emission direction, gender, age, nationality and the like of the main subject in the detection importance level setting process can be set in advance based on a predetermined operation of the operation input section 41, for example.

The information specification data d is a plurality of types of standard audio model data which are sorted by gender, age, nationality and the like. For example, the standard audio model for men is constituted with a low frequency around 300 Hz, and the standard audio model for women is constituted with a frequency around 400 Hz, the frequency being higher comparing to that for men.

As shown in FIGS. 9A, 9B and 9C, the above information specification data d may have a structure that the standard audio data indicating the feature portions of the voice and the facial feature data (the main subject information) indicating the feature portions of the face of the person are stored so as to correspond to gender, age and nationality, and that age, gender and nationality of the speaker are estimated by referring to the stored data.

The process to estimate gender of the speaker will be described in detail by using Table T1 shown in FIG. 9A. Gender of the speaker is estimated by specifying the standard audio data which is most proximate to the sound of voice obtained by the sound obtaining section 6 from the standard audio data stored in the above mentioned Table T1 shown in FIG. 9A, and the facial feature data which is stored so as to correspond to the specified standard audio data is specified.

The similar process is carried out to estimate gender and nationality.

Moreover, the estimation may be carried out by executing any calculation using the above publicly known technique.

Next, the image pickup process will be described in detail with reference to FIG. 4.

Figure 4:
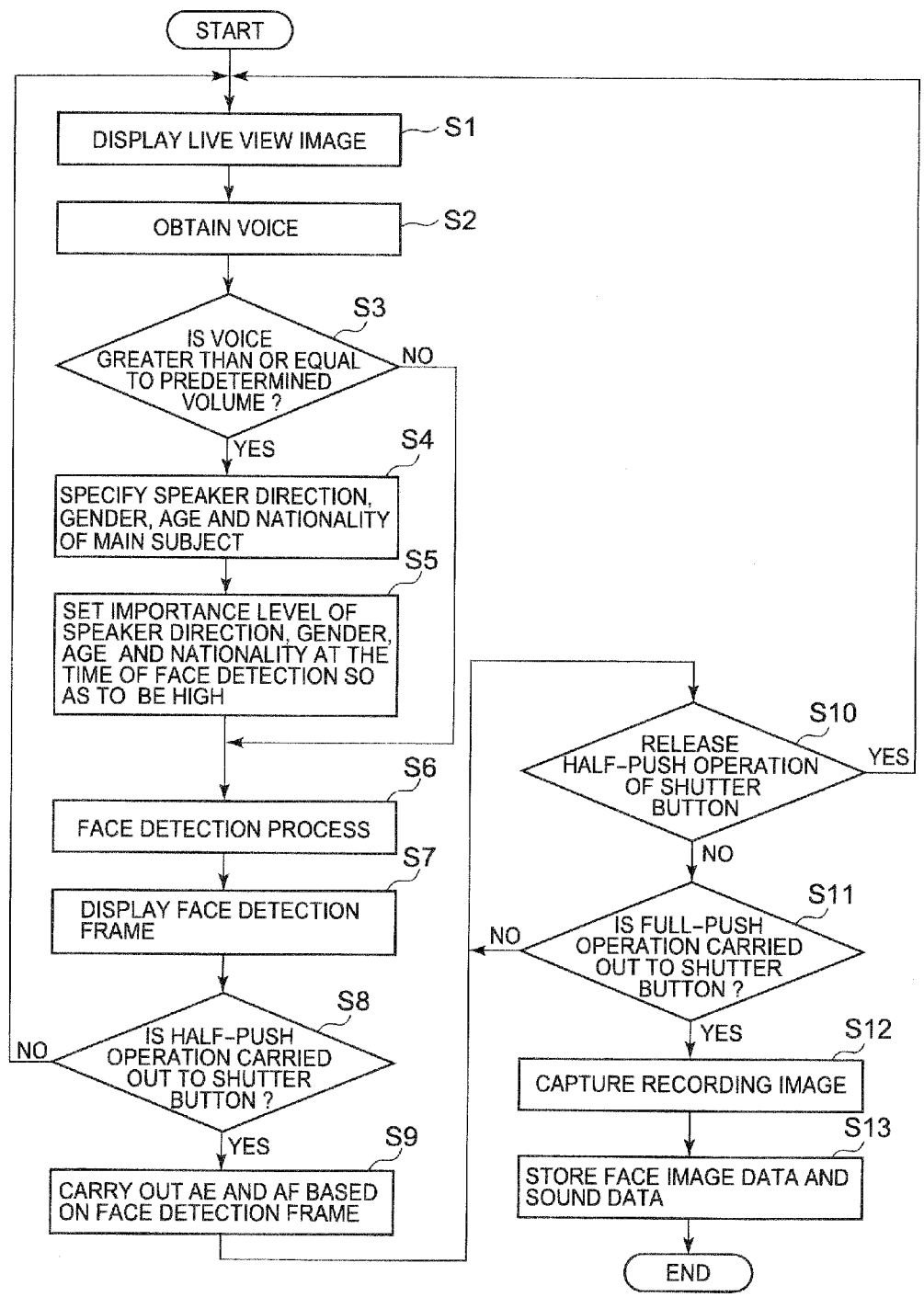
FIG. 4 is a flowchart showing an example of an operation according to an image pickup process by the image pickup apparatus of FIG. 1.

Here, FIG. 4 is a flowchart showing an example of an operation according to the image pickup process.

As shown in FIG. 4, first, picking up of the image of the subject by the image pickup section 1 is started. Then, the central control section 71 makes the image display section 32 display the live view image (through image) based on the image data which is picked up and generated by the image pick up section 1 (step S1).

Next, when the voice which is emitted from the main subject of the subjects is obtained by the sound obtaining section 6 (step S2), the central control section 71 determines whether the sound of voice obtained by the sound obtaining section 6 is greater or equal to a predetermined volume (step S3).

Here, when it is determined that the voice is greater or equal to the predetermined volume (step S3; YES), the central control section 71 executes the detection information specification program 72b in the program memory 72 and analyzes the sound data generated by the sound obtaining section 6 to specify the speaker direction of the main subject based on the analyzed result, and also refers to the information specification data d to specify gender, age and nationality of the main subject (step S4).

Here, in order to improve the recognition rate of the voice emitted from the main subject in step S2, the feature data of the voice based on a predetermined word (for example, "Take me" or the like) may be registered in advance and the main subject may be asked to speak the word.

Then, the central control section 71 executes the detection importance level setting program 72c in the program memory 72 to raise the importance level of the sound related information for detection such as the voice emission direction, gender, age, nationality and the like of the main subject for detection of the face of the specified person (step S5).

Particularly, the direction of the speaker as the main subject is set to be the center of the face detection. That is, the central control section 71 is structured so as to emphasizingly carry out the detection of the notable subject by determining that there is a great possibility that the face of the person who is the main subject exists in the direction in which the voice is detected by the sound obtaining section 6, and by specifying the range in which the notable subject is to be detected emphasizingly within the picked-up image obtained by being photographed by the image pickup section 1, the range corresponding to the direction in which the voice is detected. Thereby, the central control section 71 may be structured so as to improve the detection accuracy of the notable subject.

Moreover, the central control section 71 sets the standard of positional relation of each face part according to gender, age and nationality (for example, the central control section 71 sets the standard contrasting density of skin color which constitutes the main portion of the face according to nationality). That is, the central control section 71 may be structured to improve the detection accuracy of the notable subject by estimating the gender of the speaker by specifying the standard audio data which is most proximate to the sound of voice obtained by the sound obtaining section 6 from the standard audio data stored in Table T1 shown in the above FIG. 9A and by specifying the facial feature data which is stored so as to correspond to the specified standard audio data (the similar process is carried out to estimate gender and nationality).

Subsequently, the central control section 71 executes the face detection program 72a in the program memory 72, and executes the face detection process to detect the face of a person within the subject image based on the picked-up image data generated by the image pickup section 1 (step S6).

Particularly, the central control section 71 carries out the face detection centering on the direction of the speaker as the main subject by considering the importance level of the sound related information for detection which is set by the detection importance level setting process. Further, the central control section 71 carries out the face detection by setting the standard of the positional relation of each face part according to gender, age and nationality, and by setting the standard of the contrasting density of skin color which constitutes the main portion of the face according to nationality.

Then, when the face of the person is detected by the face detection process, the central control section 71 makes the image display section 32 carry out the OSD display of the face detection frame W (see FIG. 2B) in an approximately rectangular shape over the face (step S7).

Here, when it is determined that the obtained audio is not greater or equal to the predetermined volume in step S3 (step S3; NO), the process proceeds to step S6, and the central control section 71 carries out the face detection process without carrying out the detection importance level setting process.

Thereafter, when the half-push operation is carried out to the shutter button 41a by a user (step S8; YES), the central control section 71 carries out the automatic exposure process (AE) to adjust the exposure condition by using the face detection frame W (the image region of the main subject) which is superimposed on the face detected by the face detection process as the photometry area and the automatic focusing process (AF) to adjust the focus position by using the face detection frame W (the image region of the main subject) as the ranging area (step S9).

Then, when the full-push operation is carried out to the shutter button 41a (step S11; YES) without the half-push operation of the shutter button 41a being released by a user (step S10; NO), the central control section 71 executes the process to record the still image (the recording image) by picking up the image (step S12).

Thereafter, the central control section 71 extracts the face image data of the face detected by the face detection process, and stores the face image data and the sound data obtained by the sound obtaining section 6 in the data storage section 8 so as to correspond to one another (step S13).

Here, when the half-push operation of the shutter button 41a is not carried out by a user in step S8 (step S8; NO) or when the half-push operation of the shutter button 41a is released by a user in step S10 (step S10; YES), the process returns to step S1.

As described above, according to the image pickup apparatus 100 of the embodiment, the sound related information for detection such as the speaker direction, gender, age, nationality and the like for face detection by the face detection process is specified based on the sound data of the sound of voice obtained by the sound obtaining section 6, and the importance level of the specified audio-related-detection information is set so as to be high at the time of the face detection process. That is, in the face detection process, the speaker direction of the main subject is set as the center of the face detection, and also the standard of the positional relation of each face part is set according to gender, age and nationality. Further, the standard of contrasting density of skin color which constitutes the main portion of the face is set according to nationality.

Accordingly, the face detection of the person who is the main subject can be carried out by using the information of the voice emitted from the person who is the main subject. As a result, the detection accuracy of the main subject can be improved. Further, the face detection process can be speeded up.

Moreover, the face detection process can be carried out more properly by using the sound related information for detection because the voice emission direction, gender, age, nationality and the like of the person who is the main subject are applied as the sound related information for detection.

Here, the present invention is not limited to the above described embodiment and various improvements and changes in the design can be carried out within the scope of the invention.

Hereinafter, modification examples of the image pickup apparatus will be described with reference to FIGS. 5 to 8.

Modification Example 1

The image pickup apparatus 200 of the modification example 1 recognizes a voice emitted from a person as the main subject to specify the face image information of the person, and carries out the face detection process based on the specified face image information.

Figure 5:
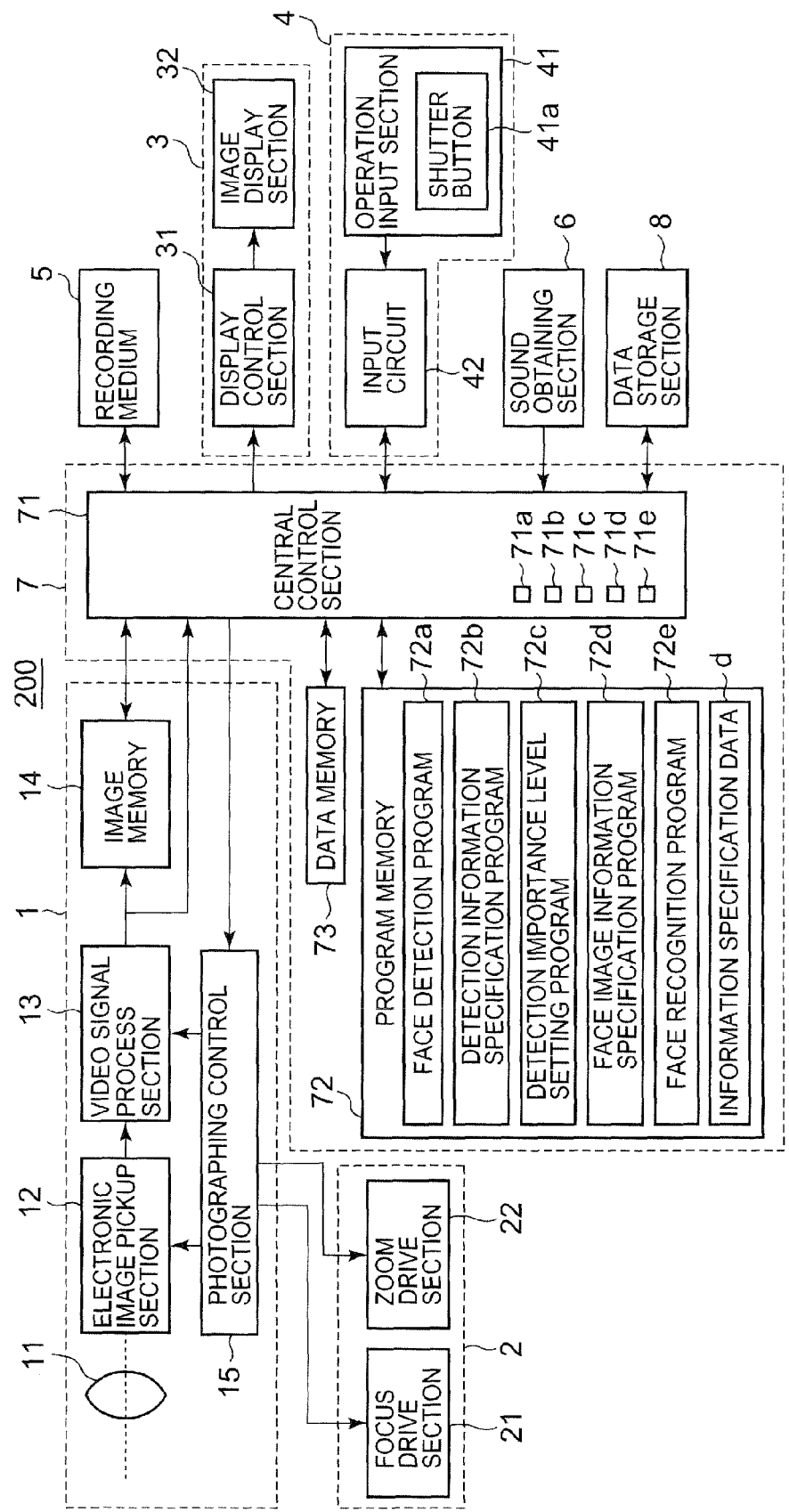
FIG. 5 is a block diagram showing an outline structure of an image pickup apparatus of the modification example 1.

Particularly, as shown in FIG. 5, the program memory 72 of the image pickup apparatus 200 of the modification example 1 stores the face image information specification program 72d and the face recognition program 72e in addition to the face detection program 72a, the detection information specification program 72b, the detection importance level setting program 72c and the information specification data d.

In order to correspond to these programs, the central control section 71 comprises the face detection program process section 71a which corresponds to the face detection program 72a, the detection information specification program process section 71b which corresponds to the detection information specification program 72b, the detection importance level setting program process section 71c which corresponds to the detection importance level setting program 72c, the face image information specification program process section 71d which corresponds to the face image information specification program 72d, the face recognition program process section 71e which corresponds to the face recognition program 72e and the like.

Here, the image pickup apparatus 200 of the modification example 1 has an approximately same structure as the image pickup apparatus 100 of the above described embodiment except for the aspects which will be described hereinafter, and the description of the sections of the image pickup apparatus 200 which are the same as those of the image pickup apparatus 100 is omitted.

The face image information specification program 72d makes the central control section 71 function as the face image information specification unit. That is, the face image information specification program 72d is a program to make the central control section 71 realize the function according to the process to specify the face image data which is recorded in the data storage section 8 so as to correspond to the sound data based on the sound data of the sound of voice obtained by the sound obtaining section 6.

Figure 7A:
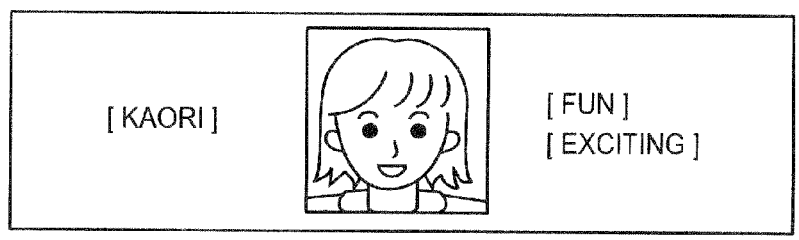
FIG. 7A is a diagram schematically showing an example of name, a face image data and a sound data of a person which are stored in a data storage section of the image pickup apparatus of FIG. 5.

Particularly, by the central control section 71 executing the face image information specification program 72d in the face detection process, the sound data (for example, "delicious!"; see FIG. 6A) of the sound of voice obtained by the sound obtaining section 6 at the time of picking up an image of the subject is analyzed, and the face image data (for example, the face image data of "Kaori") which is recorded in the data storage section 8 so as to correspond to the sound data (for example, "fun" "exciting" and the like) is specified based on the frequency characteristics of the sound data (see FIG. 7A).

Further, the detection of the face of the person who is the main subject within the subjects is carried out on the bases of the face image data specified by the face image information specification process as the standard by the central control section 71 executing the face detection program 72a in the program memory 72.

The face recognition program 72e makes the central control section 71 function as the face recognition unit. That is, the face recognition program 72e is a program to make the central control section 71 realize the function according to the face recognition process to carry out the recognition of the face of the person detected by the face detection process.

Particularly, by the central control section 71 executing the face recognition program 72e, the face of the person detected by the face detection process is specified by being recognized and the name (the main subject information) of the person according to the face of the specified person is specified by referring to the data storage section 8.

Figure 6A:
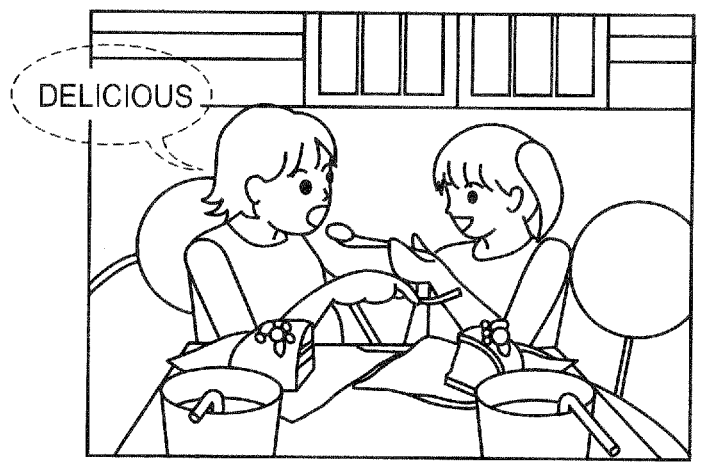
FIG. 6A is a diagram schematically showing an example of a subject image which is displayed in an image display section of the image pickup apparatus of FIG. 5.
Figure 6B:
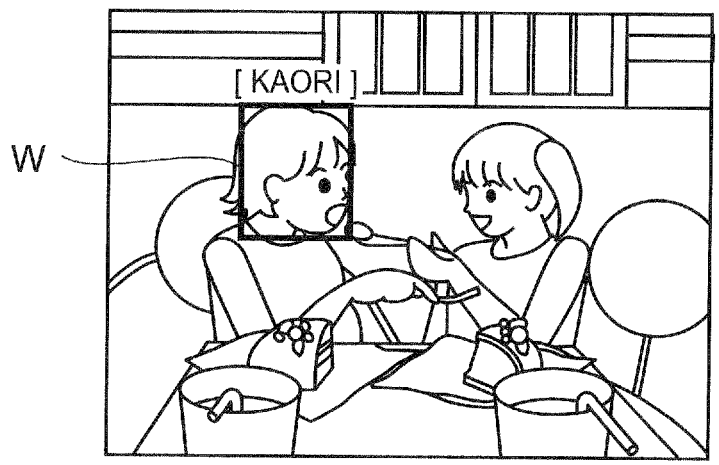
FIG. 6B is a diagram schematically showing an example of a subject image which is displayed in the image display section of the image pickup apparatus of FIG. 5.

Further, the central control section 71 makes the image display section 32 display the name (the display information of the main subject) of the person who is specified by the face recognition process so as to correspond to the face image (see FIG. 6B).

As shown in FIG. 7A, as the face information recording unit, the data storage section 8 records the face image data of the face of the person (for example, "Kaori") as the main subject and the sound data (for example, "fun", "exciting" and the like) so as to correspond to one another.

Figure 7B:
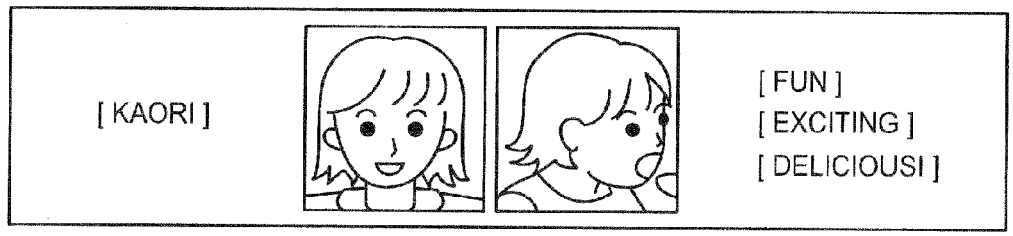
FIG. 7B is a diagram schematically showing an example of name, a face image data and a sound data of a person which are stored in the data storage section of the image pickup apparatus of FIG. 5.

Moreover, when the name of the person is specified by the face recognition process, the data storage section 8 records the face image data (the face image in right side in FIG. 7B) of the face which is newly detected by the face detection process and the sound data (for example, "delicious") which is newly obtained by the sound obtaining section 6 so as to correspond to the name of the person (for example, "Kaori") as shown in FIG. 7B.

Therefore, according to the image pickup apparatus 200 of the modification example 1, the detection of the face of the main subject within the subjects can be carried out more properly and speedily because the face image data which is recorded in the data storage section 8 so as to correspond to the sound data is specified based on the sound data of the sound of voice obtained by the sound obtaining section 6, and the detection of the face of the person who is the main subject can be carried out based on the specified face image data. That is, even when the main subject is facing sideways or when the image is in an unclear condition, the face detection of the person who is the main subject can be carried out properly based on the voice emitted from the main subject.

Moreover, the face image of the person is specified by recognizing who's (person) face is the face of the person which is detected by the face detection process, and further, the name of the person is specified and is displayed in the image display section 32 so as to correspond to the face image. Thus, the person who is detected and recognized within the subject image by the image pickup process can be notified to the photographer Thereby, the photographer can properly know whether the face recognition process is carried out appropriately or not.

Further, the data storage section 8 records the face image data of the face which is newly detected by the face detection process and the sound data which is newly obtained by the sound obtaining section 6 so as to correspond to the name of the person who is the main subject. Therefore, in the face detection process and the face recognition process which are carried out thereafter, the specification of the person who is the main subject by recognizing the person can be carried out preferably by using the face image data, the sound data and the like which are recorded in the data storage section 8.

Modification Example 2

The image pickup apparatus 300 of the modification example 2 specifies the recognition feature information such as gender, age, nationality and the like of the person in the face recognition process (the specification process of a person) by recognizing the sound of voice obtained by the sound obtaining section 6. Further, the image pickup apparatus 300 sets the priority of the recognition feature information in the face recognition process so as to be high.

Here, the structure of the image pickup apparatus 300 of the modification example 2 is approximately the same as the image pickup apparatus 100 of the above described embodiment except for the aspects described hereinafter, and the description of the sections of the image pickup apparatus 300 which are the same as those of the image pickup apparatus 100 is omitted.

Figure 8:
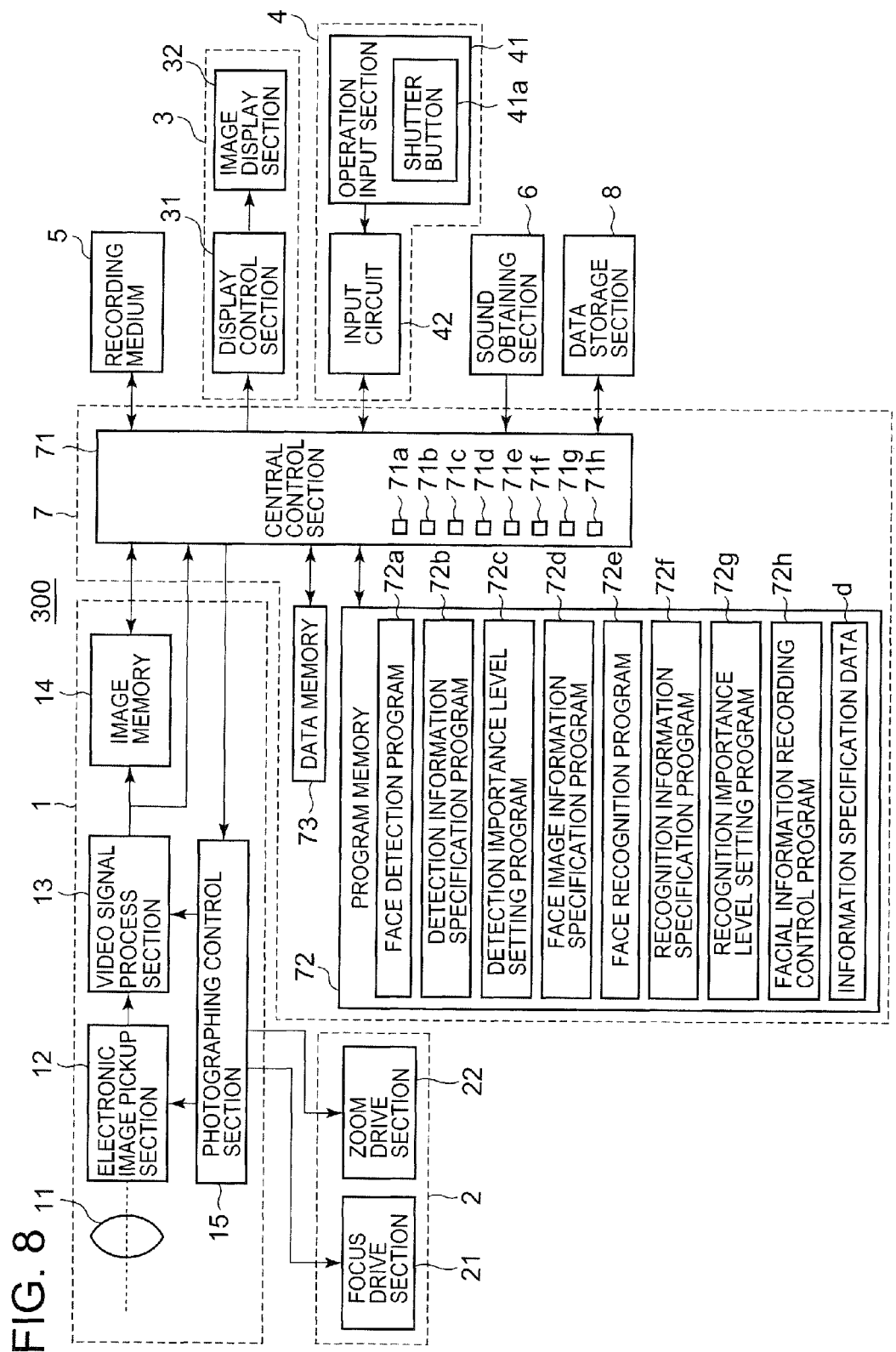
FIG. 8 is a block diagram showing an outline structure of an image pickup apparatus of the modification example 2.

That is, as shown in FIG. 8, the program memory 72 of the image pickup apparatus 300 of the modification example 2 stores the recognition information specification program 72*f*, the recognition importance level setting program 72*g* and the facial information recording control program 72*h* in addition to the face detection program 72*a*, the detection information specification program 72*b*, the detection importance level setting program 72*c*, the face recognition program 72*e* and the information specification data d.

In order to correspond to these programs, the central control section 71 comprises the face detection program process section 71*a* which corresponds to the face detection program 72*a*, the detection information specification program process section 71*b* which corresponds to the detection information specification program 72*b*, the detection importance level setting program process section 71*c* which corresponds to the detection importance level setting program 72*c*, the face image information specification program process section 71*d* which corresponds to the face image information specification program 72*d*, the face recognition program process section 71*e* which corresponds to the face recognition program 72*e*, the recognition information specification program process section 71*f* which corresponds to the recognition information specification program 72*f*, the recognition importance level setting program process section 71*g* which corresponds to the recognition importance level setting program 72*g* and the facial information recording control program process section 71*h* which corresponds to the facial information recording control program 72*h*.

The recognition information specification program 72*f* makes the central control section 71 function as the recognition information specification unit. That is, the recognition information specification program 72*f* is a program to make the central control section 71 realize the function according to the process to specify the recognition feature information of the person (the main subject) by recognizing the sound of voice obtained by the sound obtaining section 6.

Particularly, by the central control section 71 executing the recognition information specification program 72*f*, the recognition feature information such as gender, age, nationality and the like of the person (the main subject) is specified based on the frequency characteristic of the voice which is obtained by the sound obtaining section 6.

Further, the central control section 71 makes the image display section 32 display the recognition feature information such as gender, age, nationality and the like of the specified person so as to correspond to the face image (display of the display information of the main subject).

The recognition importance level setting program 72*g* makes the central control section 71 function as the recognition importance level setting unit. That is, the recognition importance level setting program 72*g* sets the priority (importance level according to the face recognition process) of the recognition feature information specified by the recognition information specification process in the face recognition process so as to be high.

Particularly, by the central control section 71 executing the recognition importance level setting program 72*g*, the face recognition process is carried out by preferentially referring to the male (female) database stored in the data storage section 8 when the person as the specified main subject is male (female) and by preferentially referring to the data base of age and nationality according to the age and nationality of the person, for example.

Moreover, the above data base may be provided with the table shown in FIG. 10.

Particularly, by the central control section 71 executing the recognition importance level setting program 72*g* in the face detection process, the sound data of the sound of voice obtained by the sound obtaining section 6 at the time when the image of the subject is being picked up is analyzed, and the face recognition process to specify the person who is stored in the registration table T4 of the data storage section 8 so as to correspond to the sound data is carried out based on the frequency characteristics of the sound data.

As shown in FIG. 10, the registration table T4 stores the name (for example, "Kaori" or the like) of each person, the sound data (for example, "fun", "exciting" and the like) obtained by the sound obtaining section 6 and the face image data detected by the face detection process so as to correspond to one another.

Therefore, according to the image pickup apparatus 300 of the modification example 2, the person who is the main subject can be specified based on the sound data of the sound of voice obtained by the sound obtaining section 6, and the person can be specified by carrying out the face recognition using the face image data of the person. As a result, the recognition accuracy of the main subject can be improved. Further, the face recognition process can be speeded up.

The facial information recording control program 72*h* makes the central control section 71 function as the facial information recording control unit. That is, the facial information recording control program 72*h* is a program to make the central control section 71 realize the function according to the process to record the recognition feature information specified by the recognition information specification process and the sound data of the sound of voice obtained by the sound obtaining section 6 in the data storage section 8 so as to correspond to the face image data.

Particularly, by the central control section 71 executing the facial information recording control program 72*h* after the face recognition process, gender, age, nationality and the like (the recognition feature information) of the person whose face is recognized by the face recognition process and the sound data are recorded in the data storage section 8 so as to correspond to the face image data.

Therefore, according to the image pickup apparatus 300 of the modification example 2, the recognition feature information such as gender, age, nationality and the like of the person in the face recognition process is specified by recognizing the sound of voice obtained by the sound obtaining section 6 and the priority of the recognition feature information in the face recognition process is set so as to be high. Thus, the face recognition process is carried out properly and speedily by preferentially referring to the data base of gender, age and nationality according to the gender, age and nationality of the person who is the main subject.

Further, because the specified recognition feature information is displayed in the image display section 32 so as to correspond to the face image, the recognition feature information of the person who is detected and recognized within the subject image in the image pickup process can be notified to the photographer, and the photographer can properly know whether the face recognition process is carried out appropriately or not.

Further, the data storage section 8 records the recognition feature information which includes gender, age, nationality and the like of the person other than the face image data of the face which is newly detected by the face detection process and the sound data which is newly obtained by the sound obtaining section 6 so as to correspond to the name of the person who is the main subject. Therefore, in the face detection process and the face recognition process which are carried out thereafter, the specification of a person as the main subject can be carried out preferably by recognizing the person who is the main subject by using the recognition feature information stored in the data storage section 8.

Moreover, because gender, age, nationality and the like of the person who is the main subject is applied as the recognition feature information, the face recognition process can be carried out more appropriately by using the recognition feature information.

Here, in the above modification example 2, the recognition feature information which includes gender, age, nationality and the like of the person is recorded in the data storage section 8 so as to correspond to the face image data. However, the recording method is not limited to this, and for example, the recognition feature information such as gender, age, nationality and the like of the person, name of the person and the like may be attached to the Exif-format image data as the Exif tag information. Thereby, the name and the recognition feature information such as gender, age, nationality and the like of the person who is the main subject can be recognized by referring to the Exif tag information of the image data even when the device is an external device other than the image pickup apparatus 300.

Moreover, in the above embodiment, the description is given by exemplifying the face of the person as the main subject. However, the main subject is not limited to this, and for example, any thing as long as it emits a voice (cry) such as vehicles including a train, an automobile, a boat, an airplane and the like and animals including a dog, a cat, a cow, a lion and the like can be the main subject. That is, by recording each image of the vehicle or the animal and the voice (cry) in the data storage section 8 so as to correspond to one another, the detection of the vehicle or the animal as the main subject can be carried out accurately from the voice (cry) of the vehicle or the animal at the time of photographing these vehicles of the animals.

Further, in the above embodiment, the voice emission direction, gender, age and nationality of the main subject are exemplified as the sound related information for detection. However, the sound related information for detection is not limited to them, and any information can be used as the sound related information for detection as long as the information is emitted from the main subject and is related to the detection of the main subject.

In addition, gender, age and nationality of the person who is the main subject are exemplified as the recognition feature information. However, the recognition feature information is not limited to them, and any information can be used as the recognition feature information as long as the information expresses the feature of the face of the person and is according to the face recognition.

Moreover, in the above embodiment, the modification example 1 and the modification example 2 are cameras which are structured separately. However, it is needless to say that one camera can be structured so that the three modes can be used by switching. In such way, convenience of the camera can be improved because a number of operation modes can be realized in one camera.

Moreover, in the above embodiment, the specification of an individual is carried out by the face recognition program 72e for the face detected by the face detection program 72a. However, the specification of an individual does not have to be carried out this way, and for example, the specification of an individual can be carried out along with the detection of the face by the face detection program in one program.

Moreover, in the above embodiment, only the case where a plurality of persons are photographed by the image pickup section 1 is described. However, the present invention can be applied even when only one person is being photographed.

That is, when the person is not detected even though the person is actually being photographed, the person can be asked to emit a voice so that the voice can be obtained by the sound obtaining section 6 and the detection of the person can be carried out by improving the detection accuracy of the person who is being photographed by referring to the main subject information according to the voice by using the result of obtaining the voice by the sound obtaining section 6.

Moreover, the structure of the image pickup apparatus 100 described in the above embodiment is an example, and the structure is not limited to this.

In addition, in the above embodiment, the functions as the main subject detection unit, the detection information specification unit, the importance level setting unit, the face image information specification unit, the face recognition unit, the feature information specification unit, the feature importance level setting unit and the facial information recording control unit are realized by the central control section 71 executing a predetermined program and the like. However, the realization of the above functions is not limited to this, and for example, the realization of the functions may be structured by a logic circuit or the like to realize various types of functions.

The entire disclosure of Japanese Patent Application No. 2007-226151 filed on Aug. 31, 2007 including descriptions, claims, drawings, and abstracts are incorporated herein by reference in its entirety.

What is claimed is:

1. An apparatus to detect a main subject from an obtained image, comprising:
    an image obtaining unit which obtains the image including the main subject;
    a sound obtaining unit which obtains a sound emitted from the main subject; and
    a main subject detection unit which detects an image region of the main subject in the image based on the image obtained by the image obtaining unit and the sound obtained by the sound obtaining unit;
    wherein the main subject detection unit comprises:
        a determination unit which determines whether or not the sound obtained by the sound obtaining unit has at least a predetermined volume;
        a detection information specification unit which specifies sound related information for detecting the main subject based on the sound obtained by the sound obtaining unit, when the determination unit determines that the sound has at least the predetermined volume;
a first detection unit which detects the image region of the main subject in the image based on the image obtained by the image obtaining unit and the sound related information specified by the detection information specification unit, when the determination unit determines that the sound has at least the predetermined volume; and
a second detection unit which detects the image region of the main subject in the image based on the image obtained by the image obtaining unit, and not based on any sound related information specified by the detection information specification unit, when the determination unit determines that the sound does not have at least the predetermined volume.

2. The apparatus according to claim 1, further comprising:
a storage unit which stores a plurality of kinds of audios obtainable by the sound obtaining unit and a plurality of kinds of main subject information in correspondence with each other,
wherein the main subject detection unit detects the image region of the main subject which emitted the sound by referring to the plurality of kinds of the main subject information stored in the storage unit and based on the sound obtained by the sound obtaining unit.

3. The apparatus according to claim 2, further comprising a setting unit which sets an accuracy of detecting the image region of the main subject by the main subject detection unit based on the sound obtained by the sound obtaining unit so as to be high.

4. The apparatus according to claim 3, wherein the storage unit stores display information corresponding to the plurality of kinds of main subject information, and
wherein the apparatus further comprises a display unit which reads the display information of the main subject from the storage unit and displays the display information.

5. The apparatus according to claim 4, wherein the display unit further displays the obtained image and displays the display information so as to correspond to the image region of the main subject included in the displayed obtained image.

6. The apparatus according to claim 3, further comprising:
a recording unit which records the obtained image;
an extraction unit which extracts the image region of the main subject from the image recorded by the recording unit; and
a recording control unit which records the image region of the main subject extracted by the extraction unit and the sound obtained by the sound obtaining unit in the recording unit so that the image region corresponds to the sound.

7. The apparatus according to claim 3, further comprising a recording unit which records main subject information which corresponds to the main subject along with the obtained image.

8. The apparatus according to claim 3, wherein the main subject is a person and main subject information which corresponds to the main subject is at least any one of gender, age, nationality and name of the person recognized by a sound emitted by the person.

9. The apparatus according to claim 3, wherein the main subject is a face of a person and main subject information which corresponds to the main subject is at least any one of feature information and image information of the face of the person.

10. The apparatus according to claim 1, further comprising:
a focusing unit which focuses on the image region of the main subject detected by the main subject detection unit; and
a recording unit which records the image region focused by the focusing unit.

11. The apparatus according to claim 1, wherein the main subject detection unit further comprises:
an importance level setting unit which sets an importance level of the sound related information that is specified by the detection information specification unit to be high in detection of the image region of the main subject by the first detection unit, when the determination unit determines that the sound has at least the predetermined volume.

12. A method of detecting a main subject of an image, comprising:
controlling an image obtaining unit to obtain the image including the main subject;
controlling a sound obtaining unit to obtain a sound emitted from the main subject; and
detecting an image region of the main subject in the obtained image based on the image obtained by the image obtaining unit and the sound obtained by the sound obtaining unit;
wherein the detecting the image region of the main subject in the obtained image comprises:
determining whether or not the sound obtained by the sound obtaining unit has at least a predetermined volume;
specifying sound related information for detecting the main subject based on the sound obtained by the sound obtaining unit, when it is determined that the sound has at least the predetermined volume;
detecting the image region of the main subject in the image based on the image obtained by the image obtaining unit and the specified sound related information, when it is determined that the sound has at least the predetermined volume; and
detecting the image region of the main subject in the image based on the image obtained by the image obtaining unit, and not based on any specified sound related information, when it is determined that the sound does not have at least the predetermined volume.

13. A non-transitory computer-readable medium having stored thereon a program which controls a computer to detect a main subject of an obtained image by performing functions comprising:
controlling an image obtaining unit to obtain the image including the main subject;
controlling a sound obtaining unit to obtain a sound emitted from the main subject; and
detecting an image region of the main subject in the obtained image based on the image obtained by the image obtaining unit and the sound obtained by the sound obtaining unit;
wherein the detecting the image region of the main subject in the obtained image comprises:
determining whether or not the sound obtained by the sound obtaining unit has at least a predetermined volume;
specifying sound related information for detecting the main subject based on the sound obtained by the sound obtaining unit, when it is determined that the sound has at least the predetermined volume;

detecting the image region of the main subject in the image based on the image obtained by the image obtaining unit and the specified sound related information, when it is determined that the sound has at least the predetermined volume; and detecting the image region of the main subject in the image based on the image obtained by the image obtaining unit, and not based on any specified sound related information, when it is determined that the sound does not have at least the predetermined volume.

* * * * *